April 15, 1924. Re. 15,817

R. H. BURFEIND

NONGROUNDED OR METALLIC LINE CIRCUIT SYSTEM

Original Filed April 18, 1907 4 Sheets-Sheet 1

Inventor:
Raymond H. Burfeind
By Chas. L. Lanly
Atty.

April 15, 1924. Re. 15,817

R. H. BURFEIND

NONGROUNDED OR METALLIC LINE CIRCUIT SYSTEM

Original Filed April 18, 1907 4 Sheets-Sheet 2

Indentor:
Raymond H. Burfeind
By Chas. H. Candy
Atty.

April 15, 1924.
Re. 15,817
R. H. BURFEIND
NONGROUNDED OR METALLIC LINE CIRCUIT SYSTEM
Original Filed April 18, 1907 4 Sheets-Sheet 3
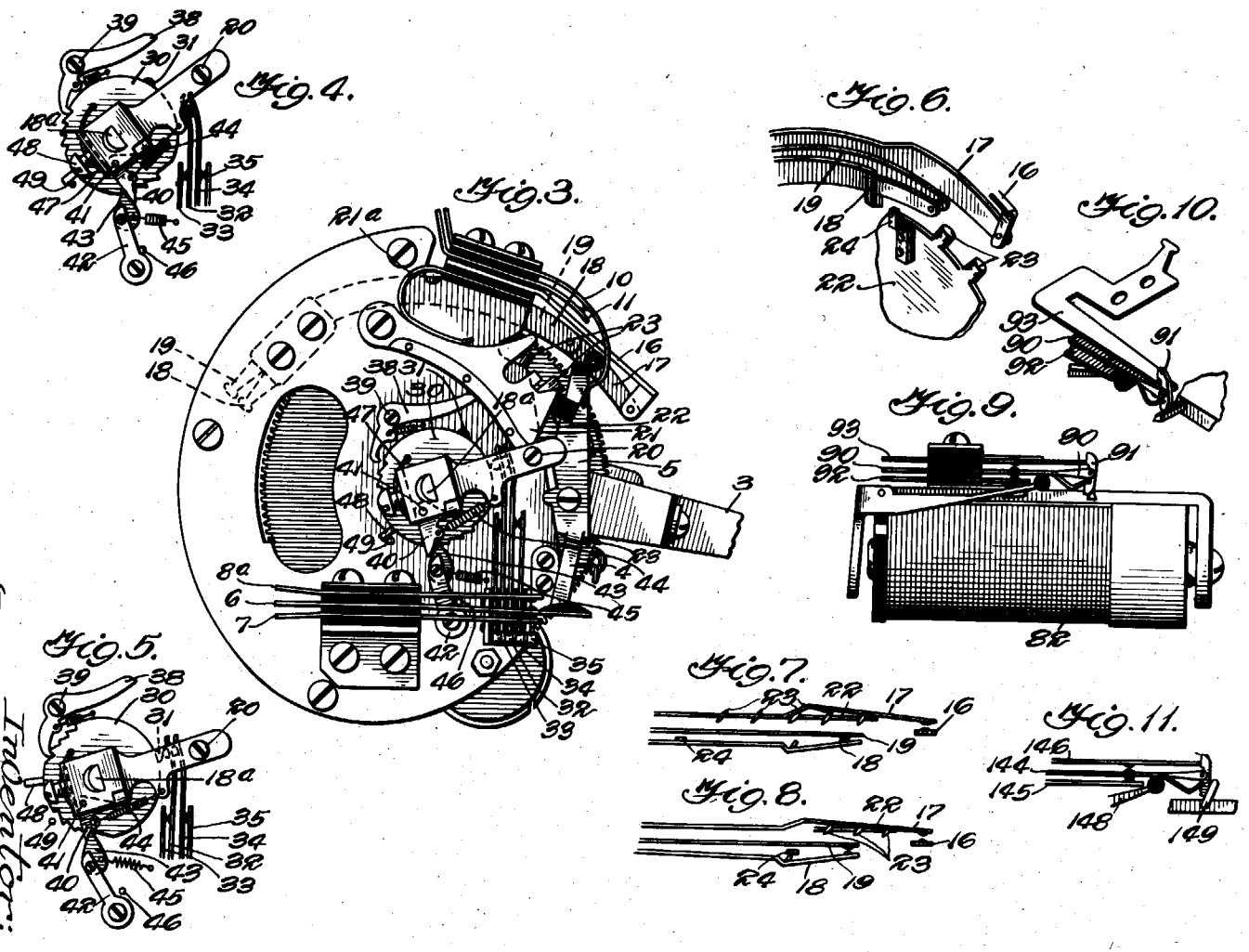
Inventor:
Raymond H. Burfeind
By Chas. H. Candy
Atty.

April 15, 1924. Re. 15,817

R. H. BURFEIND

NONGROUNDED OR METALLIC LINE CIRCUIT SYSTEM

Original Filed April 18, 1907 4 Sheets-Sheet 4

Inventor
Raymond H. Burfeind
By Chas. H. Candy
Atty.

Reissued Apr. 15, 1924. Re. 15,817

UNITED STATES PATENT OFFICE.

RAYMOND H. BURFEIND, OF CHICAGO, ILLINOIS, ASSIGNOR TO AUTOMATIC ELECTRIC COMPANY, A CORPORATION OF ILLINOIS.

NONGROUNDED OR METALLIC LINE-CIRCUIT SYSTEM.

Original application filed April 18, 1907, Serial No. 369,022. Renewed July 2, 1919, Serial No. 308,270. Original No. 1,330,999, dated February 17, 1920. Application for reissue filed August 30, 1920. Serial No. 407,037.

*To all whom it may concern:*

Be it known that I, RAYMOND H. BURFEIND, a citizen of the United States of America, and resident of Chicago, Cook County, Illinois, have invented a certain new and useful Improvement in Nongrounded or Metallic Line-Circuit Systems, of which the following is a specification.

My invention relates to telephone systems in general, but more particularly to automatic or semi-automatic telephone exchange systems, and especially to systems in which the common battery is employed for talking purposes.

In my prior application, Serial No. 369,021, filed April 18, 1907, for improvement in non-grounded or metallic line circuit systems, issued as Patent No. 1,299,119, April 1, 1919, I have disclosed a telephone exchange system having local batteries at the substations for operating the subscribers' telephones, and in which automatic switches, such as selectors and connectors, are employed for automatically extending connection from a calling telephone line to a called telephone line, said automatic switches being under the control of the calling subscribers. It will also be seen that in the said prior application the calling subscribers exercise the requisite control over the exchange apparatus without the necessity of employing operating grounds at the substations—that is to say, the exchange apparatus is controlled entirely by circuits including both sides of the telephone line, and no ground circuits are employed between the exchange and the substations. As stated, however, in the said prior application the subscribers' telephones are supplied with current from local batteries, and the current from the central battery or batteries is only employed for controlling the operations of the switches at the exchange.

My present invention, therefore, contemplates, broadly, an exchange in which the current for talking purposes is derived from the central battery or batteries from which current is supplied for operating the selectors and connectors or other switches, and in which no operating grounds are necessary at the subscribers' telephones, whereby the line circuits over which current flows for both talking and switching purposes do not include the ground between the exchange and the substations. With such arrangement each calling subscriber uses both sides of the line for calling, as well as for talking, and the automatic connection of the calling telephone line with the called telephone line is accomplished by current derived from the same battery or batteries from which current is supplied for operating the switches, and no grounding of the line is necessary at the substations in order to control the automatic switches. In this way I provide a common battery automatic telephone exchange system which is free from operating grounds outside of the exchange or central station, at least so far as the control of the automatic switches is concerned.

I also provide certain details and features of improvement and combinations tending to increase the general efficiency and serviceability of a system of this particular character, and which may be found to be useful in various connections.

In the accompanying drawings, Figures 1 and 2 taken together show two substations A and A′ in a telephone system connected by means of central office switching apparatus embodying the principles of my invention. The calling substation A, #5000, has allotted to it the first-selector switch C, and the called substation A′, #2220, has allotted to it the first selector switch C′, both of which are alike. At D there is shown diagrammatically a second-selector, and at E a connector switch. A central battery having its positive terminal preferably grounded is shown at B.

Fig. 3 is an enlarged detail view of the substation mechanism.

Figs. 4 and 5 are detail views of part of the mechanism shown in Fig. 3.

Figs. 6, 7 and 8 are detail views of the substation impulse springs.

Figs. 9, 10 and 11 are detail views of the release relays of the selector and connector switches.

Figure 1:
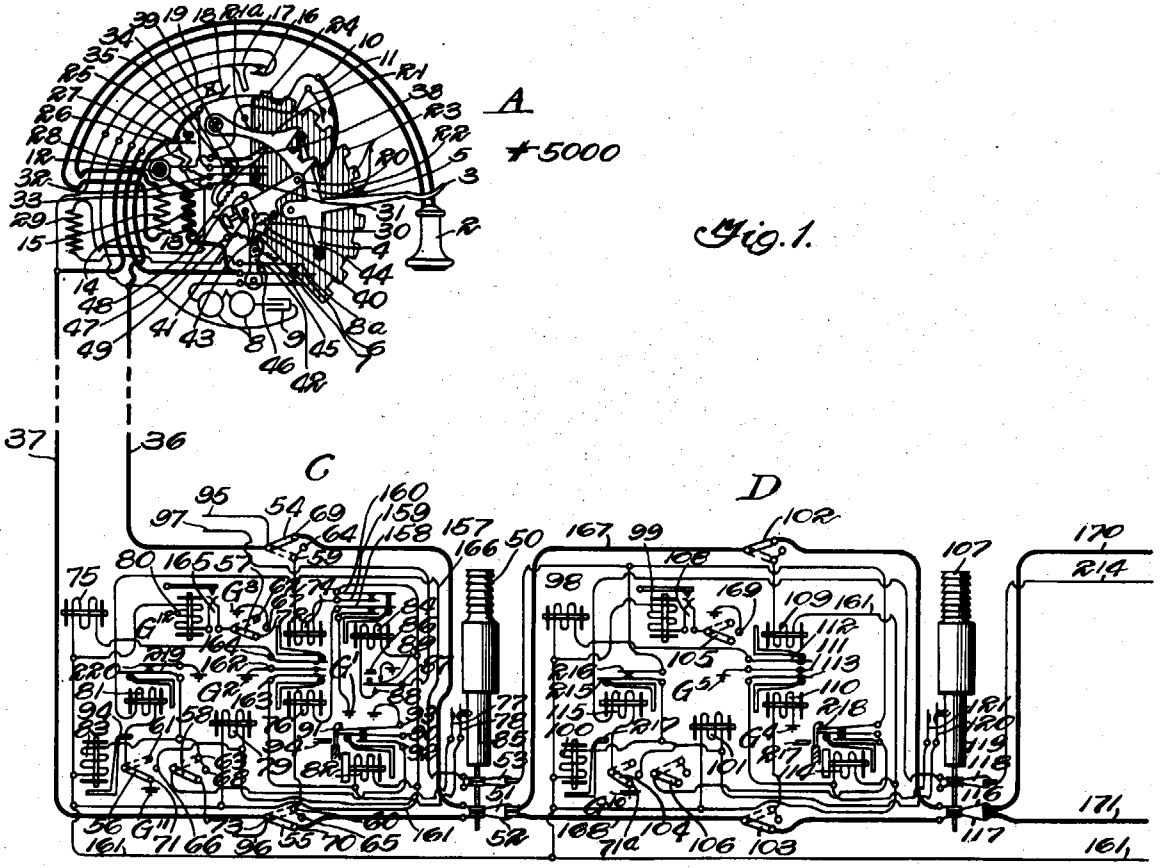

The substation A may be of any suitable or approved type. The one in connection with which I have elected to illustrate my invention comprises a receiver 2, a switch-hook 3 for controlling the substation circuits, which controlling operations are accomplished through the medium of any suitable means, such as the cam-arms 4 and 5. The circuits are so arranged that normally, while the switch-hook is down, the springs 10 and 11 are separated, and the springs 34 and 35 are also separated; the springs 10 and 34 being in multiple and the springs 11 and 35 likewise being in multiple. The springs 17 and 16, known as the vertical impulse springs, are separated; while the springs 18 and 19, known as the rotary impulse springs, are maintained in contact, as well as the springs 32 and 33. The cam-arm 4, furthermore, maintains the spring 6 away from the spring 8ᵃ and in contact with the spring 7, with the result that only the ringer 8 in series with the condenser 9 is bridged across the line while the switch-hook is down. When the subscriber removes his receiver from the switch-hook he causes a change in the circuits by shifting the spring 6 away from the spring 7 and into engagement with the spring 8ᵃ, as soon as the cam-arm 4 passes out of engagement with the spring 6. The result is that the ringer 8 and condenser 9 are disconnected from across the line, and instead a high resistance coil 29 is bridged across the line. Furthermore, as soon as the cam-arm 5 leaves the spring 10, with which it normally engages, the said spring 10 flexes into engagement with the spring 11, thereby bridging the transmitter 12 in series with the primary winding 14 of the induction-coil 13 across the line in multiple with the high resistance coil 29. The spring 10 is, however, so adjusted in relation to the locking cam 21 that when the dial is rotated the locking dog 20, upon raising the locking cam 21 a trifle, causes the said locking cam 21 to press the spring 10 away from the spring 11, thus again breaking the transmitter circuit. The induction-coil 13 is, of course, provided with the usual secondary winding 15 which is closed in a local series circuit with the receiver 2. The springs 16 and 17, known as the vertical impulse springs, and the springs 18 and 19, known as the rotary impulse springs, are operated through the medium of a dial (not shown) which is secured to the shaft upon which is mounted the locking dog 20. The said locking dog 20, as is usually the case, is adapted to lock the dial while the receiver is on the switch-hook in order to prevent its rotation.

On the aforesaid shaft there is mounted an impulse wheel 22 equipped on its periphery with the so-called vertical impulse teeth 23 and with one rotary impulse tooth 24 (Figs. 6, 7 and 8). The said impulse wheel is designed for operating the impulse springs 17 and 18. The rotary impulse teeth are so arranged that when the dial is rotated the impulse spring 17 is not carried into contact with the spring 16, but as the dial returns, first the vertical teeth press the vertical impulse springs 17 into contact with the spring 16 one or more times, and after they have completed their work the rotary impulse tooth 24 carries the rotary impulse spring 18 out of engagement with the spring 19 once. In this operation the high resistance coil 29 is short-circuited each time the springs 16 and 17 are pressed into contact, and then when the springs 18 and 19 are momentarily disengaged, the circuit through the substation is interrupted.

With the arrangement shown it will be evident that the transmitter circuit, which is opened, as stated, as soon as the dial is turned, remains open as long as the subscriber is calling, and must be closed at some time before the called subscriber answers. This closure of the transmitter circuit is accomplished by mechanical means when the dial is operated for the last digit. A ratchet mechanism advances one step each time the dial is rotated once, and upon the last operation of the dial said mechanism reaches a point that closes the springs 34 and 35 into contact and restores the transmitter circuit. The same operation that closes the springs 34 and 35 opens the springs 32 and 33, whereby the high resistance coil 29 is disconnected from the line. In detail the device by which the above is accomplished is as follows: Upon the shaft 18ᵃ (Fig. 3), on which are mounted the dial, the impulse wheel 22 and the locking dog 20, there is loosely fitted a disk or wheel 30 provided with suitable teeth upon its periphery, which teeth are adapted to be engaged at certain times by the pawl 38. As shown, this pawl is pivoted at the point 39. The said disk 30 is controlled by a suitable spring 47 which is adapted to restore the disk 30 to normal position each time that the said disk is released. The said disk 30, furthermore, carries at a suitable point upon its periphery an insulating tip or finger 31 which is adapted to engage the spring 32 when the disk 30 has been advanced to a certain point. By thus engaging and raising the spring 32 the connection is broken through the spring 33, and at the same time the springs 34 and 35 are carried into contact, as already explained. The pawl 40, which is pivotally secured at the point 41 to the locking dog 20, provides means whereby a third pawl 42 is operated to rotate the wheel 30. When the dial is turned the locking dog 20 turns also, carrying the pawl 40 into engagement with and then past the member 42 upon the end of which there is the pawl 43. The coil-spring 44 is provided for returning the pawl 40 to normal position, so that on the return motion of the dial—that is, as the locking dog returns to normal position—the pawl 40 will engage the member 42, and cause the pawl 43 to return to engagement with the teeth of the wheel 30, which wheel is thus advanced one step and retained in this advanced position by the pawl 38. In Fig. 4 this is shown very clearly and the member 40 is also shown about to engage the member 42. As the locking dog approaches its normal position the pawl 40 passes out of engagement with the member 42; and the member 42, due to the tension of the spring 45, returns to normal position against the stop 46. At any time that the switch-hook is lowered, after the disk 30 has been advanced, the cam-arm 5 passes out of engagement with the locking cam 21 and permits the latter to fall upon the end of the pawl 38. The cam 21 is provided with a suitable retracting spring 21ª having sufficient power to carry the pawl 38 out of engagement with the teeth of the wheel 30, which latter, owing to the tension of the spring 47, returns to normal position with the pin 48 against the stop 49, as shown in Fig. 3. In Fig. 5 the ratchet mechanism is shown in its final operated position—that is, after the subscriber has completed a call—the mechanism having been operated four steps, and the bushing 31 having pressed the spring 32 out of engagement with the spring 33 and carried the spring 34 into engagement with the spring 35, and the member 42 and the pawl 43 are shown in the act of disengaging from the pawl 40 and about to return to normal position against the stop 46. The means whereby a subscriber may signal a called subscriber comprises the push button 25 which, when pressed, carries the spring 26 out of engagement with the contact point 27 and into engagement with the contact point 28, whereby the line conductors 36 and 37 may be connected in series through the resistance coil 29. The first-selector switches in the system may be of any suitable or approved type, for example of the general type described in United States Patent No. 815,321, granted March 13, 1906, to Keith, Erickson and Erickson. The selector C, as shown, is a modified form of the selector described in said selector patent. The switch shaft 50 carries the vertical and rotary wipers 51 and 52, respectively and the private wiper 53. Said shaft is also equipped with a set of circular teeth on the upper part comprising any suitable number. The said shaft wipers are adapted to work in conjunction with the line and private banks of the switch, but normally rest two steps below the first level of the bank contacts. The side switch is well known and comprises the side switch wipers 54, 55, 56, 57 and 58, which may be designated as the vertical, rotary and private side switch wipers, rotary magnet wiper and release wiper, respectively. The side switch is under the control of the private magnet 79, and when the side switch is in normal or first position the wipers 54, 55, 56, 57 and 58 occupy the contact points 59, 60, 61, 62 and 63, respectively. In the second position they rest on the contact points 64, 65, 66, 67 and 68, respectively, and in the third position the contact points 69, 70, 71, 72 and 73 are engaged by their respective wipers. Through the medium of the vertical line relay 74, and while the side switch is in first position, the subscriber controls the vertical magnet 75, which latter operates to raise the switch shaft 50 and wipers 51, 52 and 53 vertically. By means of the rotary line relay 76, and before the shaft has rotated to disengage the springs 77 and 78, the subscriber controls the private magnet 79 and therefore, the side switch. While the side switch is in second position the rotary magnet 80 is energized, which magnet operates to carry the switch shaft 50 and wipers 51, 52 and 53 in a rotary direction. The relay 82 provides the means whereby the subscriber controls the release magnet 83, while the side switch is in first or second position. If the side switch passes to the third position, then, since the selector C is of the trunk-release type, the selector is controlled by means of the back-release relay 81 through the next switch, with which latter connection is then established through the private wiper 53. It will be noticed that the vertical line relay 74 is connected to the nongrounded terminal of battery B, and that the rotary line relay 76 is connected to ground; and the bridge-cut-off relay 84 is provided to open the connection between the line relays 74 and 76 and the battery terminals. This disconnection is desirable, because if the relays are not disconnected from the battery the ringing current for signaling the subscriber may operate either or both of the relays 74 and 76 and cause some interference with the switch. It is also desirable to remove the bridge formed through the said relays from across the line to give the voice-currents as clear a path as possible. Furthermore, the shaft 50 is provided with a cam 85 which, when the shaft is in normal vertical position, permits the springs 77 and 78 to disengage; but on the first vertical step of the shaft the cam 85 presses the springs into engagement. When the shaft is given a rotary step, however, the cam 85 is carried out of engagement with the springs 78, and the springs 77 and 78 disengage. The switch shaft is provided with a normal arm 86 which, when the shaft is in normal position, maintains the spring 87 in contact with the contact point 88; but when the shaft is given one or more vertical steps the normal arm 86 permits the spring 87 to engage the grounded contact point 89, whereby a guarding potential is established at the connector bank contact corresponding to the selector C.

The relay 82 (Fig. 9), upon energizing, operates to carry the spring 90 (upon the end of which there is a latch 91) from the spring 92 and into engagement with the spring 93; and when in this position the latch 91 falls over the end of the spring 93 and locks the two springs 93 and 90 in engagement. Now when the relay 82 deenergizes, the two locked springs are carried into contact with the spring 92, closing a circuit through the release magnet 83 (Fig. 1); then when the release magnet 83 energizes, the armature 94 is attracted and moves the latch 91 about its pivot points on the end of the spring 90, and unlocks the springs 90 and 93, whereby the springs disengage. The second-selector D, is the same as the selector switch C, with the exception that there are no normal conductors, such as the normal conductors 95 and 96 of the selector switch C. There is, also, no necessity in the second-selector for a bridge-cut-off relay, such as the relay 84 of the selector C, and it is also omitted, and the line relays are connected directly to the battery terminals. The private normal conductor, such as the private normal conductor 97 of the selector C, is not necessary in the second-selector and is also omitted. Since like parts are similarly represented throughout the drawings, the vertical magnet 98 and the rotary magnet 99, the release magnet 100 and the private magnet 101 will be recognized and understood. The said private magnet 101, of course, controls the side switch wipers 102, 103, 104, 105, and 106. The vertical movement of the switch shaft 107, and, therefore, of the wipers 116, 117 and 118, is controlled by the vertical magnet 98, and the rotary movement by the rotary magnet 99, the rotary magnet circuit being provided with the usual interrupter springs 108. The operative magnets of the switch are, of course, controlled by the subscriber through the use of the vertical and rotary line relays 109 and 110, as is well known. Said relays have under their control the usual springs 111, 112 and 113. The release relay 114 provides means whereby the selector D may be released while the side switch is in first or second position, and its construction and operation are exactly the same as that of the relay 82 of the first selector C. After the side switch passes to third position the release of the switch is, of course, controlled by the back-release relay 115. The shaft 107 is provided with a cam 119 which controls the cam springs 120 and 121. The connector switch E may also be of any suitable or approved type, for instance of the general type described in United States Patent No. 815,176, granted March 13, 1906, to Keith, Erickson and Erickson. The mechanical details of the first-selector and connector, as is well known, are very much the same, although there is material difference in the circuits. The connector switch shaft 122, like the first selector switch shaft, carries the line wipers 123 and 124 and the private wiper 125. The connector switch is also controlled by the calling subscriber through the medium of the vertical and rotary line relays 126 and 127. The vertical line relay directly controls the vertical magnet 128, and also the rotary magnet 129 and ringer relay 130. The function of the vertical magnet 128 is to give the shaft and shaft wipers their vertical motion, and the rotary magnet 129 imparts to the shaft and shaft wipers a rotary or circular motion. The rotary line relay 127 controls the private magnet 131, which latter, under certain conditions, controls the release magnet 132 and also the side switch wipers 133, 134, 135, 136 and 137. The side switch of the connector, like the side switch of the first-selector, has a normal or first position, a second position and a third position. The release magnet 132 is also controlled by the relay 138 which is in turn energized by the relay 139. By the condensers 140 and 141 the circuit through the connector is divided into two sections, and the back-bridge relay 142, through which current is supplied to the called subscriber for talking purposes, is bridged on the called subscriber's side of said condensers. The release relay 139 is similar to the relay 82 of the first-selector C, and when the relay 139 is energized the spring 144 (Fig. 11) is shifted out of engagement with the spring 145 and into engagement with the spring 146. The latch 147 then locks the two springs 144 and 146 in contact, and when the relay 139 deenergizes, the locked springs are then brought into contact with the spring 145, whereby an energizing circuit is closed through the relay 138; but as the armature 148 nears its normal position the latch 147 comes into contact with the beveled member 149, whereby the latch 147 is gradually pushed from the end of the spring 146; and when the armature is fully restored the springs 144 and 146 are unlocked and the spring 144 returns to normal position out of engagement with the spring 146. The central office is equipped with a busy-signalling apparatus of any suitable design, as, for example, the one comprising an interrupter 150 in series with the primary winding 151 of the induction-coil 152, whereby a busy-signaling current is induced in the secondary winding 153 of the said coil. The connector switch shaft also carries a normal post arm 154, which when the connector shaft is off normal, allows the spring 155 to engage the contact point 156. The substation A′ is like the substation A, and the first-selector switch C′ allotted to the line #2220 is like the first-selector switch C allotted to the line #5000.

A clearer understanding of my improved system may be had from an explanation of the operation of the central office switches when one subscriber calls another. Suppose, for example, that the subscriber at substation A desires to communicate with the subscriber at substation A′ on the line #2220. The operation of the central office switches to bring about this connection is as follows: When the subscriber removes the receiver 2 from the switch-hook 3, the springs 10 and 11 close, and the springs 6 and 8ᵃ close, and a circuit is thus established including the vertical and rotary line relays at the selector C, and at the substation A the resistance coil 29 and the transmitter 12 in multiple. This circuit extends from ground G′ through the springs 157 and 158, rotary line relay 75, side switch wiper 55, rotary line conductor 37, rotary impulse springs 19 and 18 to the spring 6, from which the circuit branches, one branch extending through the primary winding 14, transmitter 12, and springs 10 and 11 to the vertical line conductor 36; and the other branch extends through the springs 6 and 8ᵃ, resistance coil 29, springs 32 and 33 to the vertical line conductor 36. From the conductor 36 the circuit continues through the side switch wiper 54, vertical line relay 74, springs 159 and 160 to the battery lead 161, and through battery B to ground G. As a result both the vertical and rotary line relays operatively energize. The rotary line relay 76, upon energizing, operates to place the springs 162 and 163 in contact, whereby an energizing circuit is closed through the release relay 82. The circuit through the release relay 82 extends from ground G² through the springs 162 and 163, through the winding of the said relay to the battery lead 161, thence through battery B to ground G. The relay 82 now energizes and operates to shift the spring 90 from the spring 92 to the spring 93, whereby the two springs 90 and 93 become locked, as previously explained. The vertical line relay, upon energizing, presses the springs 162 and 164 into contact, thus closing an energizing circuit through the vertical magnet 75. This circuit extends from ground G² through the springs 162 and 164, through the vertical magnet 75 to the battery lead 161, thence through battery B and to ground G. The vertical magnet being energized operates to raise the switch shaft 50 one step, placing the shaft wipers 51, 52 and 53 one step below the first level of the selector bank. When the dial is turned for the first digit 2. the springs 10 and 11 separate, whereby the transmitter 12 is removed from across the line. As soon as the transmitter is thus removed from across the line, the resistance of the circuit that includes the line relays 74 and 76 at the selector C is increased, since the high resistance coil 29 is retained across the line at the substation. Therefore, the vertical line relay 74 weakens sufficiently to permit the armature to fall back, whereby the springs 162 and 164 separate. This occurs when the dial is pulled down; then as the dial returns to normal position, the vertical impulse springs 16 and 17 are pressed into contact twice, and the rotary impulse springs 19 and 18 are separated once. When the springs 16 and 17 engage, the line conductors 36 and 37 are then short-circuited, thereby shunting or short-circuiting the resistance coil 29. When the springs 16 and 17 engage a new circuit is established through the substation A which includes only the vertical and rotary line relays 74 and 76. Since this circuit does not include the resistance coil 29, sufficient current now flows in the circuit to operatively energize the vertical line relay 74. The springs 16 and 17 being pressed into contact twice, the vertical line relay is again operatively energized twice, thereby pressing the springs 162 and 164 into contact and closing an energizing circuit each time through the vertical magnet 75. This circuit extends from ground G² through the springs 162 and 164, vertical magnet 75 to the battery lead 161, and through battery B to ground G. The vertical magnet being energized twice more raises the shaft and shaft wipers 51, 52 and 53 two steps to a position opposite the second bank level, which contains the terminals of the trunk lines leading to the second-selector switches of the two thousand group. At the first vertical step of the shaft the switch shaft springs 77 and 78 that are normally disengaged are pressed into contact by the cam 85, whereby an energizing circuit is established through the private magnet 79. This energizing circuit extends from ground G² through the springs 162 and 163, through the switch shaft springs 77 and 78 to the private magnet 79, thence through said magnet to battery lead 161, and through battery B to ground G. When the rotary impulse tooth 24 separates the rotary impulse springs 18 and 19, the circuit through the substation, which comprises the vertical and rotary line relays in series with the resistance coil 29, is then broken, thereby permitting the rotary line relay 76 to momentarily de-energize when the springs 18 and 19 are disengaged.

When the rotary line relay deenergizes, the springs 162 and 163 disengage, thereby breaking the energizing circuit through the release relay 82 and private magnet 79. The private magnet 79, upon de-energizing, permits the side switch to pass from first to second position. The release relay 82, however, being a slow-acting relay, is maintained in its operated position while the energizing circuit is momentarily broken. As soon as the impulse springs 18 and 19 again engage, the energizing circuit through the rotary line relay 76 is again established, and again the energizing circuit through the release relay 82 is established. When the side switch wiper 57 passes to the contact point 67, an energizing circuit is established through the rotary magnet 80, said circuit extending from ground $G^3$, contact point 67, side switch wiper 57, interrupter springs 165, thence to the battery lead 161, and through battery B to ground G. The rotary magnet operates to carry the shaft and shaft wipers in a rotary direction into contact with the first set of contacts of the second level. When the shaft is given its first rotary step the cam 85 passes out of engagement with the springs 77 and 78, whereby the said springs disengage, breaking the energizing circuit through the private magnet; but if the first set of contacts is busy, the private wiper 53 meets a guarding potential and a new energizing circuit is established through the private magnet 79, said circuit extending from the grounded contact point to the private wiper 53, conductor 166, back-release relay 81, side switch wiper 56, contact point 66, private magnet 79 to the battery lead 161, and through battery B to ground G. Therefore, the side switch is locked in second position until the rotary magnet carries the wipers beyond the last busy trunk line. When the last busy contact is passed over, the energizing circuit through the private magnet becomes broken, permitting the private magnet to be de-energized and the side switch to pass from second to third position, whereby the energizing circuit through the rotary magnet 80 becomes broken as the side switch wiper 57 leaves the grounded contact point 67. Also, when the side switch wipers 54 and 55 engage the contact points 69 and 70, respectively, the subscriber's vertical and rotary line conductors 36 and 37 are extended to the trunk conductors 167 and 168, respectively, assuming that the shaft wipers 51 and 52 are in engagement with the contacts corresponding to the trunk conductors leading to the second-selector switch D. Of course, when the side switch passes to third position the line relays 74 and 76 are disconnected from the subscriber's line, and the rotary line relay 76 de-energizes as a result. When the rotary line relay 76 de-energizes, the springs 162 and 163 separate, so that the energizing circuit is broken through the release relay 82. When the relay 82 de-energizes, the springs 92, 93 and 90 come into contact, but since the side switch wiper 58 is in third position this is of no consequence. The operation of the side switch of the selector C furthermore, places the side switch wiper 56 in engagement with the grounded contact point 71, as a result providing a guarding potential at the private wiper 53 for protecting the seized trunk leading to the selector D from interference. When the line conductors 36 and 37 are thus extended to the selector D a series circuit is closed including the vertical and rotary line relays 109 and 110 of the selector D and the resistance coil 29 of the substation A. This circuit extends from ground $G^4$ through the rotary line relay 110, side switch wiper 103, rotary trunk conductor 168, shaft wiper 52, side switch wiper 55 to the rotary line conductor 37, through the substation, as previously traced, to the line conductor 36, side switch wiper 54, shaft wiper 51, vertical trunk conductor 167, side switch wiper 102, vertical line relay 109 to the battery lead 161, and through battery B to ground G. The relays 109 and 110 of the selector D are arranged like the relays 74 and 76 of the selector C that is, when the series circuit through the substation includes the resistance coil 29, the current-flow is not sufficient to operatively energize the vertical line relay 109, but is sufficient to operatively energize the rotary line relay 110; and when this series circuit does not include the resistance coil 29 the current-flow is sufficient to operate the vertical line relay 109.

The rotary line relay, upon energizing, operates to close the springs 111 and 113 in contact, whereby an energizing circuit is closed through the release relay 114, in the manner explained in connection with the release relay 82 of the selector C. The energizing circuit for the said relay 114 extends from ground $G^5$ through the springs 111 and 113 to the relay 114, thence through said relay to battery lead 161, and through battery B to ground G. It will be remembered that when the dial returns to rest, after calling the first digit, the ratchet wheel 30 rotates one step in the manner previously explained. The operation of the dial for the second digit 2 causes the springs 16 and 17 to engage twice, and the springs 18 and 19 are disengaged once. The vertical line relay 109 operates twice to close the springs 111 and 112 in contact which in turn close an energizing circuit through the vertical magnet 98. This circuit extends from ground $G^5$ through the springs 111 and 112 to the vertical magnet 98, thence to the battery lead 161, and through battery B to ground G. The shaft wipers of the selector D are raised two steps and brought opposite the second level of the bank contacts which are the terminals of trunk lines leading to the connectors of the two-hundred group of the second thousand. At the first vertical step of the switch shaft 107 the private magnet 101, like the private magnet 79 of the selector C, is energized at the instant that the cam 119 presses the cam springs 120 and 121 into contact. As soon as the circuit is closed the energizing current flows from ground $G^5$ through the springs 111 and 113, through the cam springs 121 and 120 to the private magnet 101, thence through said magnet to the battery lead 161, and through battery B to ground G. On the rotary impulse—that is, when the springs 18 and 19 are disengaged—the energizing circuit through the rotary line relay 110 is interrupted and the said relay deenergizes, permitting the springs 111 and 113 to disengage, thus in turn breaking the energizing circuit through the private magnet 101 and the release relay 114. The release relay 114, being like the release relay 82 of the selector C, remains in its operated position until the energizing circuit is again established through the rotary line relay 110. But the private magnet, upon deenergizing, permits the side switch to pass from first to second position, whereby the side switch wiper 105 engages the grounded contact point 169. The selector D now rotates in the same manner as the selector C to select the idle trunk line leading to the connector E, and after the last busy contact has been passed over by the private wiper 118 the side switch passes to third position, thereby breaking the circuit through the rotary line relay 110 and extending the subscriber's vertical and rotary line conductors 36 and 37 to the trunk conductors 170 and 171 which lead to the connector E. When the circuit is broken through the rotary line relay 110 the springs 111 and 113 fall apart, thus breaking the energizing circuit for the release relay 114. The passage of the side switch to third position not only accomplishes all this, but also, as soon as the side switch wiper 104 engages the contact point $71^a$, a guarding potential is established at the private wiper 118 for protecting the seized line against interference. Of course, it will be understood that by the operation of the dial for the second digit the ratchet wheel 30 at the substation is advanced a second step. When the side switch wipers 102 and 103 pass to third position the series circuit including the rotary and vertical line relays at the selector D and the resistance coil 29 at the substation A is broken, and a new series circuit is formed which includes the vertical and rotary line relays 126 and 127 of the connector E, energizing the latter. When the rotary line relay 127 energizes, as stated, it places the springs 172 and 173 in contact, thereby closing a circuit through the release relay 139. This circuit extends from ground $G^6$ through the springs 173 and 172, release relay 139, thence to battery lead 161, and through battery B to ground G. The relay 139, upon energizing, operates to lock the springs 144 and 146 in contact, as explained.

When the vertical impulse springs 16 and 17 of the substation A are pressed into contact for the third digit the vertical line relay 126 is energized twice, and the springs 174 and 175 are pressed onto the ground spring 173. The engagement of the springs 174 and 173 closes the circuit through the vertical magnet 128, said circuit extending from ground $G^6$ through the springs 173 and 174, side switch wiper 135, contact point 176, vertical magnet 128 to the battery lead 161, and through battery B to ground G. The engagement of the springs 175 and 173 in the first instance also closes an energizing circuit through the private magnet 131, said circuit extending from ground $G^6$ through the springs 173 and 175, conductor 177, side switch wiper 136, private magnet 131 to the battery lead 161, and through battery B to ground G. The private magnet 131 energizes and places the springs 178 and 179 in contact, whereby a locking or retaining circuit is established through the private magnet. This circuit extends from ground $G^6$ through the springs 173 and 172, private magnet springs 178 and 179, private magnet 131 to the battery lead 161, and through battery B to ground G. The vertical magnet 128 being operated twice for the third digit, the connector shaft 122 and shaft wipers 123, 124 and 125 are carried two steps and brought opposite the level in which are located the terminals of the normal conductors leading to the line #2220. When the rotary impulse tooth 24 of the impulse wheel separates the springs 18 and 19, the energizing circuit of the rotary line relay 127 is broken, and the springs 173 and 172 momentarily disengage, whereby the retaining circuit through the private magnet 131 is broken. The private magnet de-energizes and permits the side switch to pass to second position. Again it should be noted that the third operation of the dial advances the ratchet wheel 30 at the substation another step. The operation of the dial for the last digit (naught) energizes the vertical line relay 126 ten times, thus placing the springs 174 and 173 in contact ten times, whereby the rotary magnet 129 is operated to rotate the shaft wipers 123, 124 and 125 to the last contact of the second level of the connector bank. The circuit through the rotary magnet 129 extends from ground $G^6$ through the springs 173 and 174, side switch wiper 135, contact point 180, rotary magnet 129 to the battery lead 161, and through battery B to ground G. Of course, when the vertical line relay is energized for the last digit, and when the spring 175 engages the spring 173 at the first impulse, the circuit through the private magnet 131 is again closed, and at the instant that said magnet energizes it again places the springs 178 and 179 in contact, again locking itself. When the rotary line relay 127 is de-energized for the last digit the private magnet de-energizes with one of two results, namely the so-called busy-release of the connector switch, or the side switch passes to third position. It will be assumed, first that the latter result occurs. Then when the side switch wipers 133 and 134 engage the contact points 181 and 182, respectively, the calling subscriber's line conductors 36 and 37 are extended to the normal conductors 183 and 184 which lead to the terminals of the called line #2220. When the side switch wiper 137 engages the grounded contact point 185 a guarding potential is established at the connector bank to prevent any other subscriber from calling in on the same line. Also, this closing in contact of the wiper 137 and contact point 185 closes an energizing circuit through the cut-off relay 186 of the selector C′. This circuit extends from the grounded contact point 185 to the side switch wiper 137, shaft wiper 125, normal conductor 187, normal spring 188, contact point 189, through the cut-off relay 186 to the battery lead 161, and through battery B to ground G. When the said relay 186 energizes it operates to disconnect the vertical line relay 74ᵃ from the nongrounded terminal of battery B, and the rotary line relay 76ᵃ from the grounded terminal of battery B, in order to prevent the called subscriber from operating his selector switch C′ when he answers. It will be remembered that as the dial returned to normal position, after being operated for each digit, the ratchet wheel 30 is rotated one step; and since the dial was operated four times for the number 2220 the ratchet wheel 30 has been advanced four steps, whereby the bushing 31 carries the spring 32 out of engagement with the spring 35.

The disengagement of the springs 32 and 33 and the engagement of the springs 34 and 35, destroys, first, the series circuit through the substation, including the resistance coil 29, and establishes a new series circuit through the substation, including the primary winding and transmitter. This circuit extends from the vertical line conductor 36 through the push-button spring 26, contact point 27, springs 34 and 35, transmitter 12, primary winding 14, through the rotary impulse springs 18 and 19 to the rotary line conductor 37. The resistance of the circuit through the substation, including the vertical and rotary line relays 126 and 127 of the connector E, is thus sufficiently reduced to permit the current-flow to operatively energize the vertical line relay 126 of the connector E. It should be explained that the object in energizing the vertical line relay 126, as soon as the last operation of the dial is completed, is to prevent the ringer relay 130 from energizing. To signal the called subscriber, the calling subscriber presses the signaling button 25, whereby the spring 26 is carried out of engagement with the contact point 27 and into engagement with the contact point 28, whereby the resistance coil 29 is again bridged across the conductors 36 and 37 and the transmitter circuit removed. The resistance of the circuit including the vertical and rotary line relays is thus again raised, whereby the vertical line relay 126 is again rendered inoperative. Accordingly, the spring 174 falls back into normal engagement with the spring 190, whereby (since the side switch wiper 135 is now in engagement with the grounded contact point 191) an energizing circuit is established through the ringer relay 130. This energizing circuit extends from the grounded contact point 191 through the side switch wiper 135, springs 174 and 190, ringer relay 130 to the battery lead 161, and through battery B to ground G. The ringer relay, upon energizing, operates to shift the spring 192 from the spring 193 to the spring 194, and to place the springs 195 and 196 in contact. By this operation the ringer generator H is bridged across the normal conductors of the called line to operate the ringer 197 at the substation A′. The ringing current passes from the ringer generator H through the springs 196 and 195, side switch wiper 133, contact point 181, shaft wiper 123, normal conductor 183, vertical line conductor 198, condenser 199, ringer 197, springs 200 and 201, rotary impulse springs 202 and 203 to the rotary line conductor 204, normal conductor 184, shaft wiper 124, contact point 182, side switch wiper 134, ringer relay springs 192, and 194, back to the ringer generator H. As soon as the calling subscriber ceases to press the signaling button 25 the spring 26 returns to normal position, thereby cutting the resistance coil 29 out of the circuit through the substation, and closing the circuit which includes the transmitter and primary winding. As soon as this second circuit is closed the vertical line relay 126 of the connector E re-energizes, thereby breaking the energizing circuit through the ringer relay 130. The subscriber at the called substation A′, in response to the signal removes the receiver from the switch-hook. When the receiver is up the cam-arm 205 permits the springs 206 and 207 to engage, whereby the primary winding 208 and transmitter 209 are bridged across the line conductors 198 and 204. The closing of these springs also completes a circuit which provides the called substation with battery current for talking purposes. This circuit extends from the grounded contact point 185, through the side switch wiper 137, winding 210 of the relay 142, thence through the ringer springs 193 and 192, side switch wiper 134, contact point 182, shaft wiper 124, normal conductor 184, rotary line conductor 204, rotary impulse springs 203 and 202, primary winding 208, transmitter 209, springs 207 and 206, through the signaling springs to the vertical line conductor 198, normal conductor 183, shaft wiper 123, side switch wiper 133 to the winding 211 of the coil 142, thence to battery lead 161, and through battery B to ground G.

Figure 2:
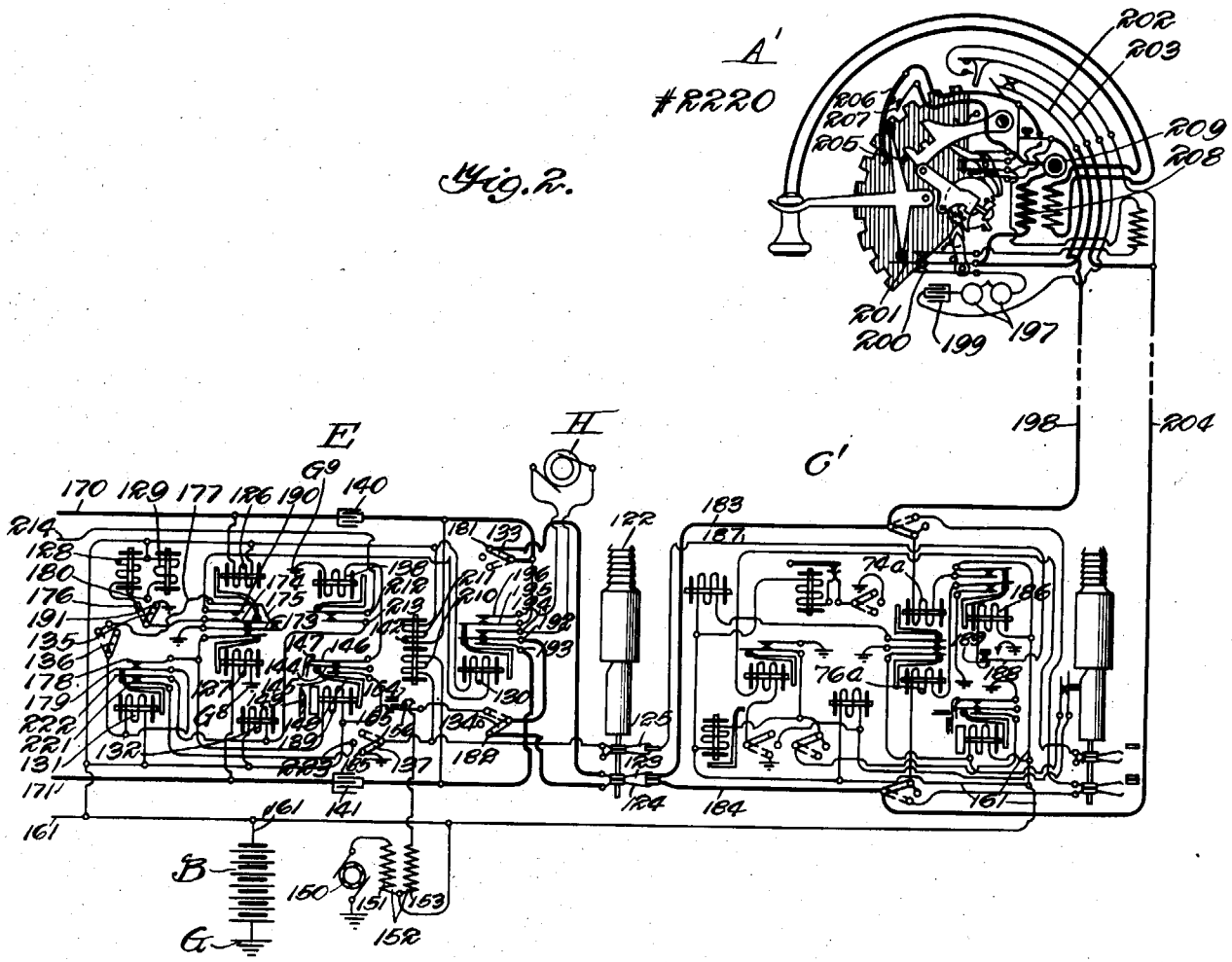
Figure 12:
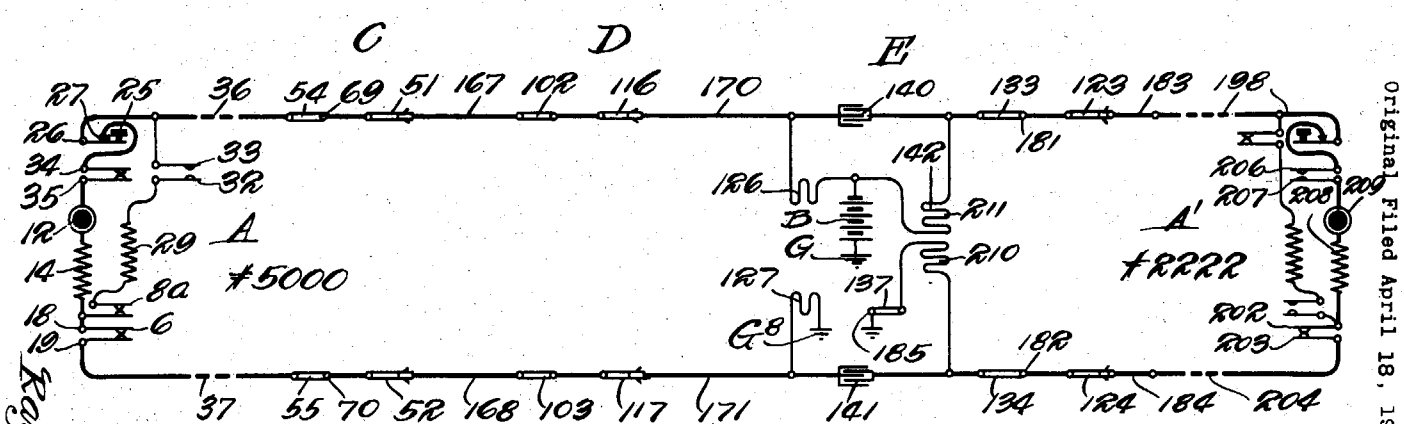
Fig. 12 is a diagrammatic view of the talking circuit between two substations.

The circuit which provides the calling subscriber with battery current for talking purposes extends from ground $G^8$ through the rotary line relay 127 to the trunk conductor 171, shaft wiper 117 to the trunk conductor 168, shaft wiper 52 to the rotary line conductor 37, thence through the rotary impulse springs 19 and 18, primary winding 14, transmitter 12, springs 35 and 34, through the signalling springs to the vertical line conductor 36, side switch wiper 54, shaft wiper 51, conductor 167, shaft wiper 116, trunk conductor 170, vertical line relay 126 to the battery lead 161, and through battery B to ground G. The two substations A and A′ being thus provided with battery current for talking purposes, conversation may be carried on over the circuits shown by heavy lines in Figs. 1, 2 and 12. The release of the central office switching apparatus occurs when the calling subscriber opens up his line circuits by restoring the receiver to the switch-hook. The subscriber's line may be opened up, if the subscriber hangs up his receiver before the last operation of the dial, by the separation of the substation springs 6 and $8^a$; but after the last operation of the dial the opening up of the circuit occurs when the springs 34 and 35 separate. The separation of the said springs 34 and 35, of course, occurs at the instant that the ratchet 30 is released, Therefore, the release at this stage—that is, after the calling subscriber has established connection with the called line—follows as a result of the separation of the springs 34 and 35. The rotary line relay 127 of the connector E now de-energizes, thereby breaking the energizing circuit through the release relay 139, which in turn de-energizes and places the locked springs 144 and 146 in contact with the spring 145, thus closing an energizing circuit through a second release relay 138. This circuit extends from ground $G^9$ through the relay 138, springs 146, 144 and 145 to the battery lead 161, and through battery B to ground G. The release relay 138, upon energizing, closes the springs 212 and 213 in contact, whereby a series circuit is closed through the release relay 115 of the second-selector D and the release magnet 132 of the connector E. This circuit extends from ground $G^{10}$ through the side switch wiper 104 of the selector D, release relay 115, shaft wiper 118, conductor 214, through the springs 212 and 213, release magnet 132 to the battery lead 161, and through battery B to ground G. The connector release magnet, upon energizing, operates to restore the connector switch shaft and side switch to normal position, at which time, also, the bridge-cut-off relay 186 of the first-selector C′ deenergizes, restoring the line relays $74^a$ and $76^a$ to the control of the called subscriber. The release relay 115 of the selector D, upon energizing, places the springs 215 and 216 in contact, thereby closing a series release circuit including the release relay 81 of the first-selector C and the release magnet 100 of the second-selector D. This circuit extends from ground $G^{11}$ through the side switch wiper 56, release relay 81, conductor 166, shaft wiper 53, through the springs 216 and 215 of the release relay 115, release magnet 100 to the battery lead 161, and through battery B to ground G. When the release magnet 100 of the selector D energizes it attracts its armature 217, which latter operates to release the latch 218, whereby the springs of the release relay 114 may be restored to normal position. The release armature 217, furthermore, assumes a position in which it is ready to release the selector switch D as soon as the release magnet 100 deenergizes. The release relay 81, being also in this circuit, energizes and places the springs 219 and 220 in contact, whereby a circuit is closed through the release magnet 83 of the selector C. This circuit extends from ground $G^{12}$ through the springs 220 and 219, through the magnet 83 to the battery lead 161, and through battery B to ground G. This magnet operates to attract its armature 94, at which time the latch 91 is released and the springs 90 and 93 of the release relay 82 are unlocked. At the same time the release armature 94 assumes a position to release the switch C as soon as the release magnet 83 deenergizes. In the meantime, while the release magnets and relays are being energized, the armature 148 of the release relay 139 of the connector E permits the latch 147 to strike the sloping member 149, thereby releasing the spring 146 and as a result destroying the energizing circuit of the release relay 138. Said relay 138, of course, in turn permits the springs 212 and 213 to separate, whereby the trunk-release circuit that includes the connector release magnet 132 and the back-release relay 115 of the selector D is broken. The connector E is thus left fully restored, and the release relay 115 of the selector D, upon permitting the springs 216 and 215 to disengage, causes the de-energization of the release magnet 100 of the selector D and of the back release relay 81 of the selector C. The release magnet 100 of the selector D then causes a restoration of the selector D, while the back-release relay 81 of the selector C, by breaking the energizing circuit of the release magnet 83, causes the latter to release the said selector C.

When the last rotary impulse was sent in from the substation by the subscriber, separating the springs 18 and 19, it was assumed that the called line was not busy and that the side switch tripped to third position; but if the desired line is busy a guarding potential protects it against intrusion, and if it is assumed that the line #2220 is busy when the subscriber #5000 calls, as explained, the busy-release of the connector E follows as a result of the de-energization of the rotary line relay 127 for the last digit. If the rotary magnet 129, in operating to carry the shaft wipers onto the proper contact for the last digit, rotates the private wiper 125 onto a busy or grounded contact, then when the rotary line relay 127 de-energizes and breaks the locking or retaining circuit through the private magnet 131, this ground potential is transmitted to the release magnet 132, when the private magnet springs 221 and 222 engage, thus establishing an energizing circuit through the release magnet 132, said circuit extending from the grounded shaft wiper 125 through the side switch 137, contact point 223, private springs 221 and 222, release magnet 132 to the battery lead 161, and through battery B to ground G. The release magnet, upon energizing, releases the connector switch shaft and restores the connector side switch to its first position, returning the vertical magnet 128 to the control of the vertical line relay 126. Since the busy-release occurs upon the last operation of the dial, it will be evident that by the time the side switch is restored to first position by the busy-release, the ratchet 30 at the substation has operated to disconnect the high resistance coil 29 from the line, substituting instead the circuit through the springs 34 and 35. Evidently, therefore, the vertical and rotary line relays 126 and 127 will both energize simultaneously. As a result of the energization of the vertical line relay 126, the shaft 122 will be raised and the private magnet 131 will again be locked. Of course, the locking of the private magnet at this time is simply incidental. When the subscriber now presses his signaling button 25 it simply has the effect of throwing the high resistance coil 29 in the line circuit, and as a result the vertical line relay 126 de-energizes each time it is thrown in; but the only effect of this operation is that the shaft 122 will be raised one step each time, and this is also incidental. At the first vertical step of the shaft 122 the normal post arm 154 leaves the spring 155, which latter then engages the contact point 156, closing a busy-signaling circuit through the substation, over which circuit a current flows from the busy coil 153. The calling subscriber upon hearing the busy signal will understand that the line is busy, and upon restoring his receiver to his switch-hook will initiate the releasing of the switching apparatus in the manner already described; the only difference being that the connector side switch is now in first instead of third position, which, of course, makes no difference. If the subscriber should attempt to release at the end of the third operation of the dial—that is, at a stage in the call where the connector side switch is found in second position—the release of the switches is initiated, when the subscriber hangs his telephone on the switch-hook, by opening the subscriber's line circuit at a point between the springs 6 and $8^a$, this, of course, occurring as soon as the cam-arm 4 meets the spring $8^a$. If the subscriber should desire to release the switches after the first operation of the dial—that is, after the selector C has established connection with the selector D—or, as a matter of fact, at any time before the side switch of the selector D passes to third position, he may release the selectors D and C by hanging up his receiver as usual, at which time the springs 6 and $8^a$ will be separated and the line circuit broken in the manner already explained. The rotary line relay 110 will, of course, de-energize, and the release relay 114 will also de-energize, and as a result a release circuit is established comprising the release magnet 100 and back-release relay 81 in series at the instant that the springs of the release relay 114 come into contact. The release relay 81 will, of course, in turn cause the energization of the release magnet 83 of the selector C. The release magnet 100 of the selector D, upon energizing, releases the latch 218 of the release relay 114, breaking the trunk-release circuit, and thus causing the restoration of all of the switches in the manner already explained.

The release relays 82, 114 and 139 may be wound to any suitable resistance, but good results have been obtained when wound to a resistance of twenty-three hundred ohms; the vertical line relays 74, 109 and 126 to one hundred ohms; the rotary line relays 76, 110 and 127 to five hundred ohms; and the substation resistance coil 29 to three thousand ohms.

It will be understood that the second-selector and connector switches may be employed on a percentage basis. To illustrate specifically: In an automatic exchange of ten thousand capacity a somewhat common arrangement is to divide the subscribers and their allotted first-selectors into groups of thousands. Each thousand-group is subdivided into groups of one hundred. Then the like hundreds—that is, the one-hundreds, the two-hundreds, etc.—of the various thousands are arranged in groups, so that in a ten-thousand system the one-hundreds of the thousands form one group, the two-hundreds form a second group, etc. Furthermore, each bank level of each of these hundred-groups has allotted to it one group of second-selectors allotted to the thousands corresponding to the level—that is, the second-selector-group of the first-selector first bank level is allotted to the first thousand, the second level to the second thousand, etc., thus taking care of the thousands. Furthermore, the second selector-groups of each thousand are arranged in one group, and each bank level in each of these second-selector-groups has allotted to it a group of connectors, which in turn are allotted to the hundred of the corresponding thousand corresponding to the level—that is, the connector-group of the second-selector first bank level falls in the first hundred of its thousand, and of the second level in the second hundred, etc., thus taking care of the hundreds; there being in a ten-thousand system ten one-thousand-groups of first-selectors; ten one-hundred-groups in each thousand; ten cross-hundred-groups in the ten-thousands; also ten groups of second-selectors, one for each thousand; and ten groups of connectors in each thousand, one for each hundred. With this arrangement it will be understood that the first level of the first hundreds in all thousands in the system is multipled in a manner well understood, likewise the second level, etc. Also, all like levels of each second-selector-group (one of which, as stated, is allotted to each thousand) are likewise multipled. In each of the aforesaid connector-groups, and in the same manner, the like levels are of course, also multipled.

From the foregoing it will be seen that I provide a highly efficient common battery automatic telephone exchange system in which the lines are free from operating grounds outside of the exchange or central station—that is to say, which are free from ground connections at the substations for controlling the automatic switches. In this way I employ complete metallic circuits for both calling and talking purposes, and the current for controlling the automatic switches is derived from the same battery or batteries from which current is supplied for talking purposes.

What I claim as my invention is:—

1. In a telephone system, telephone lines, automatic means including a pair of numerical progressively movable switches for extending connection from a calling one of said lines to a called one, successive circuits by which a calling subscriber controls said automatic means to extend a talking circuit to the called line, each of said circuits including the two sides of the calling line in series, said automatic means comprising current feeding connections for supplying all the talking current to the talking circuit, means for applying said connections to the talking circuit, said connections normally disconnected from said lines.

2. A telephone system comprising telephone lines, an automatic connector for extending connection from a calling line to a called line, successive circuits for controlling said connector, each circuit including the two sides of the calling line in series, and means controlled at the connector for supplying all the talking current to the calling subscriber's line.

3. A telephone system comprising telephone lines, an automatic connector switch for extending connection from a calling line to a called line; successive circuits for controlling said connector, each circuit including the two sides of the calling line in series, and means controlled at the connector for supplying talking current to the called subscriber's line.

4. In a telephone system, the combination of trunk lines, automatic trunk selectors, connectors for extending trunk line connections to the called lines, successive line circuits by which the calling subscriber controls one or more selectors and a connector to extend connection to the called subscriber's line, each circuit including the two sides of the calling telephone line in series, and means controlled at the connectors for supplying all the talking current to the calling subscriber's lines.

5. A telephone system comprising a telephone line, an automatic trunk selecting switch, trunk lines, a metallic line circuit for controlling said switch to extend a talking circuit to another line via one of said trunk lines, impedance coils in said trunk line normally disconnected from the telephone line, means for connecting said coils to said line for supplying all the talking current to the talking circuit, and means for releasing and restoring said switch by opening said telephone line, whereby the operation and the release of said switch is independent of the earth at the subscriber's station.

6. A telephone system comprising telephone lines, automatic means including a pair of numerical progressively movable switches for trunking a calling line into talking connection with a called line, successive circuits for controlling said automatic means, each circuit including the two sides of the calling line in series, transmitters in the talking circuit, said automatic means comprising current feeding connections normally disconnected from said lines, means for supplying all the current to the talking circuit to charge the transmitters, and means for releasing the connection between the two lines by opening the circuit through the transmitter of the calling line.

7. A telephone system comprising telephone lines, automatic means including a pair of numerical progressively movable switches for trunking calling lines into connection with called lines, successive circuits for controlling the automatic means, each circuit including the two sides of the calling line in series, said automatic means comprising current feeding connections normally disconnected from said lines, transmitters for said lines, said automatic means comprising devices for applying said current feeding connections to the talking circuit for supplying all the current to said transmitters over said lines, and means for breaking the connection between the two lines by opening the circuit through the transmitter of one of the connected lines.

8. In a telephone system, the combination of numerical automatic switches, metallic circuits for successively controlling a plurality of said switches to extend a talking circuit between a calling and a called line, a central source of current for talking purposes, current feeding connections normally disconnected from the lines, said automatic switches comprising means for applying said connections to the talking circuit for supplying all the current to the subscriber's stations from said source.

9. In a telephone system, the combination of telephone lines, automatic connector switches less in number than said telephone lines, successive line circuits for controlling said connectors, each said circuit including the two sides of a calling line in series, and means controlled at the connectors for supplying all the talking current to the telephone lines.

10. A telephone system comprising a talking circuit, transmitters in said circuit, a high resistance coil in shunt of each transmitter, automatic switches, means for short circuiting said resistance coils to operate said switches, and a central source of current-supply for furnishing talking current to said transmitters.

11. In a telephone system, a calling line, a selector switch, means for extending a connection from said line to said selector, a trunk line, means for operating said selector to seize said trunk, an automatic connector at the opposite end of said trunk, a called telephone line with which said connector is adapted to establish connection, a pair of line relays in said connector for controlling its operation, a battery permanently bridged in series between said relays across the trunk line, and means for supplying talking current to the calling line through said relays from said battery.

12. In a telephone system, a plurality of subscribers' lines divided into groups, a trunk line, means for connecting said trunk with one of said subscriber's lines, an automatic connector switch connected to the opposite end of said trunk, said connector having one motion to select groups and a second motion to find a called line in a selected group, a pair of line relays in said connector for controlling its operation, a battery permanently bridged in series between said relays across said trunk, and means for supplying talking current to the calling line through said relays from said battery.

13. In a telephone system, a plurality of subscribers' lines divided into groups, a trunk line, means including an automatic selector switch for extending a connection from one of said lines to said trunk, an automatic connector switch at the opposite end of said trunk, said connector having one motion to select groups and a second motion to connect with a called line in a selected group, a pair of line relays in said connector for controlling its operation, a battery permanently bridged in series between said relays across said trunk line, and means for supplying talking current to the calling line through said relays from said battery.

14. In a telephone system, means for establishing a talking circuit between two lines, comprising a plurality of selectors each selector having quick and slow relays and a side switch having a plurality of positions, release circuits, means controlled by said slow relays when energized for maintaining said circuits open, means whereby said slow relays may release said switches while the said switches are in first or second position, and a centralized battery for operating and talking purposes.

15. In a telephone system, means for establishing a talking circuit between two points comprising selector switches, a slow acting relay and a quick-acting back-release relay in each switch, a side switch, any one of said switches having three operative positions, a release circuit, means controlled by one of said slow relays when energized for maintaining said circuit open, means whereby said slow acting relay may release said selector while said side switch is in first or second position, means whereby said quick acting relay may release said switch after the side switch passes to third position, and a central battery for supplying current for operating and talking purposes.

16. In a telephone exchange system, a subscriber's line, a transmitter, a calling mechanism, a ratchet wheel, a dial for operating said wheel, a resistance coil normally in bridge of the line, means whereby said resistance coil is disconnected from the line by the operation of said wheel and the transmitter bridged across the line at the same time, and switching means responsive to said mechanism.

17. In a telephone system, a subscriber's line, an automatic substation on said line, suitable calling mechanism comprising a ratchet device provided with a pawl, an operating dial, means whereby said ratchet device is advanced one step for each operation of the dial, said ratchet held by said pawl at each step and adapted to be released when the receiver is restored to the switch hook and carried into normal position, and switching means responsive to said mechanism.

18. In a telephone exchange system, a subscriber's line, an automatic substation on said line, a suitable calling mechanism at said substation comprising a high resistance coil adapted to be bridged across the line when the switch hook rises, a ratchet device adapted to be operated step by step on the transmission of a call, means whereby said resistance coil is disconnected from across the line at the last step of the ratchet device, additional means for temporarily bridging said resistance coil across said line, and an automatic switch controlled thereby.

19. In a telephone exchange system, a subscriber's line, an automatic substation on said line, a suitable calling mechanism, means whereby the transmitter of said substation is adapted to be bridged across the line when the switch hook rises, a step-by-step ratchet device for use in transmitting a call, means for opening said transmitter bridge during the operation of said dial, means upon the last operation of said dial to again close said bridge, and switching means responsive to said mechanism.

20. A telephone system comprising telephone lines, an automatic connector for extending connection from a calling line to a called line, provided with means having vertical motion to select groups and rotary motion to connect with a line in the selected group, successive circuits for controlling said connector, each circuit including the two sides of the calling line in series, and means controlled at the connector for supplying all the talking current to the calling subscriber's line.

21. A telephone system comprising telephone lines, an automatic connector switch for extending connection from a calling line to a called line, provided with means having vertical motion to select groups and rotary motion to connect with a line in the selected group, successive circuits for controlling said connector, each circuit including the two sides of the calling line in series, and means controlled at the connector for supplying talking current to the called subscriber's line.

22. In a telephone system, the combination of trunk lines, automatic trunk selectors, connectors for extending trunk line connections to the called lines, provided with means having vertical motion to select groups and rotary motion to connect with a line in the selected group, successive line circuits by which the calling subscriber controls one or more selectors and a connector to extend connection to the called subscriber's line, each circuit including the two sides of the calling telephone line in series, and means controlled at the connectors for supplying all the talking current to the calling subscriber's lines.

23. In a telephone system, the combination of a telephone line, a central source of talking current, means for controlling the supply of talking current to the telephone line, trunk lines, an individual trunking switch for said telephone line provided with means having vertical motion to select groups and rotary step-by-step motion to connect with a line in the selected group, and a pair of circuits for controlling both the operation and the release of said individual switch, each circuit including the two sides of the telephone line in series.

24. A telephone system comprising a telephone line, an automatic switch provided with means having vertical step-by-step motion to select groups and rotary motion to connect with a line in the selected group, a plurality of magnets in said switch; a central source of current for supplying all the talking current through said magnets to the calling and called telephone lines, a complete metallic line circuit for controlling said switch, means for signaling the called subscriber, and means for releasing or restoring said switch by opening of the telephone line, whereby both the operation and the release of said switch is independent of the earth at the subscriber's station.

25. In a telephone system, the combination of telephone lines, automatic connector switches less in number than said telephone lines, provided with means having vertical motion to select groups and rotary motion to connect with a line in the selected group, successive line circuits for controlling said connectors, each said circuit including the two sides of a calling line in series, and means controlled at the connectors for supplying all the talking current to the telephone lines.

26. In a telephone system, the combination of subscribers' lines, subscribers' individual trunking switches, automatic connector switches less in number than the subscribers' lines, provided with means having vertical motion to select groups and rotary motion to connect with a line in the selected group, metallic line circuits for controlling the individual switches and the connectors, each said line circuit including the two sides of a calling telephone line in series, and means controlled at the connectors for supplying all the talking current to the telephone lines.

27. A telephone system comprising a talking circuit, transmitters in said circuit, a high resistance coil in shunt of each transmitter, automatic switches provided with means having vertical motion to select groups and rotary motion to connect with a line in the selected group, means for short-circuiting said resistance coil to operate said switches, and a central source of current supply for furnishing talking current to said transmitters.

28. In a telephone system, a calling telephone line, a trunk line connected therewith, an automatic connector at the end of said trunk line, provided with means having vertical motion to select groups and rotary motion to connect with a line in the selected group, a called telephone line temporarily seized by said connector, a pair of line relays in said connector, a battery permanently bridged in series between said relays across the trunk line, and a transmitter in the line of the calling subscriber, said transmitter receiving talking current from said battery over said permanent bridge.

29. In a telephone system, a calling telephone line, a trunk line, an automatic connector at the end of said trunk line, provided with means having vertical motion to select groups and rotary motion to connect with a line in the selected group, means for connecting the telephone line with the trunk line, a called telephone line temporarily seized by said connector, a pair of electromagnets permanently bridged across said trunk line, a battery permanently connected in series between said electromagnets, a transmitter in the line of the calling subscriber, and means for supplying all the talking current to said transmitter from said battery over said bridge.

30. In a telephone system, the combination of a telephone line, a central source of talking and controlling current, means for controlling the supply of talking current to the telephone line, trunk lines, an individual trunking switch for said telephone line provided with means having vertical motion to select groups and rotary motion to connect with a line in the selected group, calling mechanism requiring a separate manual operation thereof for each digit of the called number, operative to transmit suitable controlling current for one digit before the said mechanism is manually operated for the next digit, and a plurality of different circuits for controlling both the operation and the release of said individual switch, each circuit including said mechanism and the two sides of the telephone line in series.

31. In a telephone system, a calling telephone line, a trunk line, an automatic connector switch at the end of said trunk line and individual thereto, means for connecting the telephone line with the trunk line, a called telephone line temporarily seized by said connector, a pair of electromagnets permanently bridged across said trunk line in said conector switch, a battery permanently connected in series between said electromagnets, calling mechanism requiring a separate manual operation thereof for each digit of the called number, operative to transmit suitable controlling current for one digit before the said mechanism is manually operated for the next digit, and a transmitter in the line of the calling subscriber, adapted to receive talking current from said battery through said bridge.

32. In a telephone system, a calling telephone line, a trunk line connected therewith, a numerical automatic connector switch at the end of said trunk line provided with means having vertical motion to select groups and rotary motion to connect with a line in the selected group, a called telephone line temporarily seized by said connector, a pair of line relays in said connector, a battery permanently bridged in series between said relays across the trunk line, calling mechanism requiring a separate manual operation thereof for each digit of the called number, operative to transmit suitable controlling current for one digit before the said mechanism is manually operated for the next digit, and a transmitter in the line of the calling subscriber, said transmitter receiving talking current from said battery through said relays.

33. In a telephone system, a calling telephone line, a trunk line, an automatic connector at the end of said trunk line, provided with means having vertical motion to select groups and rotary motion to connect with a line in the selected group, means for connecting the telephone line with the trunk line, a called subscriber's telephone line temporarily seized by said connector, a pair of electromagnets permanently bridged across said trunk line in said connector switch, a battery permanently connected in series between said electromagnets, calling mechanism requiring a separate manual operation thereof for each digit of the called number, operative to transmit suitable controlling current for one digit before the said mechanism is manually operated for the next digit, and a transmitter in the line of the calling subscriber, adapted to receive talking current from said battery through said electromagnets.

34. In a telephone system, the combination of a plurality of switches each adapted for both vertical and rotary step-by-step motion, in response to one or more impulses for the called number, telephone lines, successive line circuits for successively controlling the said switches to extend connection from a calling line to a called line, said line circuits each including the two sides of the calling line in series and a pair of magnets in the controlled switch, and means for supplying current over the telephone lines to operate said switches, and for talking purposes also.

35. In a telephone system, the combination of trunk-lines, an automatic step-by-step trunking switch provided with trunk-selecting mechanism, and with releasing mechanism, a telephone line, a subscriber's releasing device for said telephone line, successive line circuits for controlling the operation of said switch, said circuits each including the two sides of the telephone line in series, the release mechanism of said switch being directly responsive to a subscriber's releasing device, and means for supplying current over the telephone line to operate said switch, and for talking purposes also.

36. In a telephone system, a plurality of subscribers' lines, means including automatic switches controllable over two sides of the line circuit in series for establishing connection between said lines, a source of ringing current, means for increasing the resistance on the calling line, and means controlled by said increase of resistance for connecting said ringing current with the called line.

37. In a telephone system, a plurality of subscribers' lines, means including automatic switches controllable over two sides of the line circuit in series for establishing connection between said lines, means for increasing the resistance of said connection, a source of ringing current normally disconnected from the called subscriber's line, and means controlled by said increase of resistance for connecting said ringing current with the called line.

38. In a telephone system, a plurality of subscribers' lines, means including automatic switches controllable over two sides of the line in series for establishing connection between two of said lines, a push button at the calling subscriber's line, means controlled by said push button for increasing the resistance on said line, a source of ringing current, and means controlled by said increase of resistance for connecting said ringing current with the called line.

39. In a telephone system, a switch having a movable contact arm, means for releasing the same including a release magnet and a relay slow to release its armature, said relay controlling the release magnet during the time said switch is operating to move said contact arm, a quick-acting relay controlling the release magnet after the switch has operated independently of said slow relay, and a central source of talking and operating current for said system.

40. In a telephone system, a trunk, a switch for extending connection thereto, releasing means for said switch including a relay slow to release its armature, said relay controlling the release continuously after the operation of the switch is started and until connection is extended to the trunk, a quick-acting relay controlled over said trunk for controlling the release after the switch has established the connection, and a central source of talking and operating current for said system.

41. In a telephone system, a trunk, a switch for extending connection therefrom, releasing means for said switch including a release magnet and a relay slow to release its armature, said relay controlling the release magnet continuously throughout the time the switch is operating, a quick-acting relay controlling the release magnet after connection has been established from the trunk independently of said slow relay, and a central source of talking and operating current for said system.

42. In a telephone system, means for establishing a call, means for releasing the call including a release magnet and relays slow to release their armatures, said relays controlling the release magnet continuously during the establishment of the call, quick acting relays for controlling the release magnet during conversation independently of said slow acting relays, and a central source of talking and operating current for said system.

43. In a telephone system, a calling and a called line, a selector switch and a connector switch, means for controlling the selector over the calling line to select said connector and extend the calling line thereto, means for controlling said connector over the calling line to extend the connection to said called line, means in said connector for supplying talking current to the calling and called lines, a release magnet in said selector, a slow acting relay controlling said release magnet throughout the selecting operation of said selector, and a quick acting relay controlling said release magnet independent of said slow relay after the calling line has been extended to said connector.

44. In a telephone system, a calling and a called line, a selector switch and a connector switch, means for controlling the selector over the calling line to select said connector and extend the calling line thereto, means for controlling said connector over the calling line to extend the connection to said called line, means in said connector for supplying talking current to the calling and called lines, a release magnet in said selector, a slow acting relay controlling said release magnet throughout the selecting operation of said selector, a quick acting relay controlling said release magnet independent of said slow relay after the calling line has been extended to said connector, a circuit for said quick relay extending between the selector and connector, and means in the connector controlled by the calling subscriber for controlling said circuit.

45. In a telephone system, a calling and a called line, a train of serially related automatic switches for connecting said lines, means including a line relay in each switch for operating the same, a control circuit for each line relay including the two talking conductors of the calling line in series, means in each switch except the last for disconnecting its associated line relay from the calling line as soon as the switch is operated, means in the final switch for supplying talking current to the calling and called lines, trunk release circuits independent of the talking conductors for releasing all said switches except the last, and means in the final switch for controlling said release circuits.

46. In a telephone system, a calling and a called line, a selector switch having two line wipers and a test wiper, means including a line relay in said selector directively controlled over the two talking conductors of the calling line in series to operate the switch to extend a connection toward the called line, means for disconnecting the line relay from the line when the switch is operated, other switching mechanism then controlled over the two talking conductors of the calling line in series to complete the connection to the called line, the control circuit for said other switching mechanism including the line wipers of said selector, means in one of said other switching mechanisms for supplying talking current to the calling line over a circuit including the two line wipers of said selector, and a circuit for releasing said first selector including said test wiper.

47. In a telephone system, a step by step switch having a movable contact arm, means for releasing said switch including a release magnet and a relay slow to release its armature, said relay controlling the release magnet throughout the time said switch is operating to move said contact arm a plurality of steps, a quick acting relay controlling the release magnet after the switch has operated independently of said slow relay, and a central source of talking and operating current for said system.

Signed at Chicago, Illinois, this 26th day of August, 1920.

RAYMOND H. BURFEIND.